(12) United States Patent
Carroll (10) Patent No.: US 9,026,904 B2
(45) Date of Patent: May 5, 2015

(54) AUTOMATIC MODIFICATION OF CASCADING STYLE SHEETS FOR ISOLATION AND COEXISTENCE

(75) Inventor: Paul L. H. Carroll, Lakeway, TX (US)

(73) Assignee: International Business Machines Corporation, Armonk, NY (US)

(*) Notice: Subject to any disclaimer, the term of this patent is extended or adjusted under 35 U.S.C. 154(b) by 524 days.

(21) Appl. No.: 13/419,991

(22) Filed: Mar. 14, 2012

(65) Prior Publication Data

US 2013/0246909 A1    Sep. 19, 2013

(51) Int. Cl.
*G06F 17/22*    (2006.01)

(52) U.S. Cl.
CPC .......... *G06F 17/2247* (2013.01); *G06F 17/227* (2013.01)

(58) Field of Classification Search
USPC ......... 715/234, 235, 236, 239, 249, 760, 204, 715/205, 226, 255, 256, 762, 793, 841
See application file for complete search history.

(56) References Cited

U.S. PATENT DOCUMENTS

| | | | |
|---|---|---|---|
| 6,589,291 B1* | 7/2003 | Boag et al. ................... | 715/235 |
| 6,886,046 B2* | 4/2005 | Stutz et al. ................... | 709/246 |
| 6,996,780 B2* | 2/2006 | Estrada ........................ | 715/751 |
| 7,028,262 B2* | 4/2006 | Estrada et al. ................ | 715/751 |
| 7,134,073 B1* | 11/2006 | Fiedorowicz et al. ........ | 715/235 |
| 7,383,498 B1* | 6/2008 | Hickl et al. ................... | 715/235 |
| 7,398,472 B2* | 7/2008 | Corrington et al. .......... | 715/762 |
| 7,519,915 B2* | 4/2009 | Shalabi et al. ............... | 715/762 |
| 7,581,173 B1* | 8/2009 | Ferguson et al. ............. | 715/235 |
| 7,770,106 B2* | 8/2010 | Waldman et al. ............. | 715/235 |
| 7,770,108 B2* | 8/2010 | Fiedorowicz et al. ........ | 715/236 |
| 7,917,860 B2* | 3/2011 | Gossman ...................... | 715/765 |
| 8,065,620 B2* | 11/2011 | Chen et al. .................... | 715/744 |
| 8,225,234 B2* | 7/2012 | Olander et al. ............... | 715/853 |
| 8,397,159 B2* | 3/2013 | Ji et al. .......................... | 715/234 |
| 2002/0149618 A1* | 10/2002 | Estrada et al. ................ | 345/760 |
| 2003/0005002 A1* | 1/2003 | Chen et al. .................... | 707/515 |
| 2003/0037076 A1* | 2/2003 | Bravery et al. ............... | 707/517 |
| 2003/0084405 A1* | 5/2003 | Ito et al. ........................ | 715/513 |
| 2006/0010374 A1* | 1/2006 | Corrington et al. .......... | 715/517 |
| 2006/0206808 A1* | 9/2006 | Jasthi et al. ................... | 715/522 |
| 2007/0220480 A1* | 9/2007 | Waldman et al. ............. | 717/106 |

(Continued)

FOREIGN PATENT DOCUMENTS

CN           101685447 A         3/2010
WO     WO 2005/038610 A2 *    4/2005

OTHER PUBLICATIONS

"O'Reilly xml.com, xml from the inside out—Printing XML: Why CSS is Better that XSL", Nov. 5, 2005, 9 pages.*

(Continued)

*Primary Examiner* — Maikhanh Nguyen
(74) *Attorney, Agent, or Firm* — Stevens & Showalter, LLP (57) ABSTRACT

Cascading style sheet rules are managed by identifying a markup page of content items and designating a plurality of super-themes using markup elements. Super-themes associate at least one content item of the markup page with a corresponding cascading style sheet class. Cascading style sheet rules are further managed by loading a common cascading style sheet and automatically modifying the common cascading style sheet to use each super-theme as a parent selector for at least one cascading style sheet rule applied to at least one content item within the markup element associated with the super-theme.

20 Claims, 6 Drawing Sheets

(56) References Cited

U.S. PATENT DOCUMENTS

2007/0240041 A1    10/2007  Pearson
2008/0178072 A1*    7/2008  Fiedorowicz et al. ........ 715/235
2010/0180194 A1     7/2010  Ji et al.
2012/0173967 A1*    7/2012  Lillesveen .................... 715/235
2013/0151951 A1*    6/2013  Hall ............................. 715/235

OTHER PUBLICATIONS

"Cascading Style Sheet", Aug. 1, 2006, 14 pages.*
"Whitepaper, Introduction to JSR 168—The Jave Portlet Specification", Sun Microsystems, Inc., 2003, 17 pages.*
H. Lie, "Cascading Style Sheets", Level 1, Jan. 1999, W3C, pp. 1-70.*

* cited by examiner

AUTOMATIC MODIFICATION OF CASCADING STYLE SHEETS FOR ISOLATION AND COEXISTENCE

BACKGROUND

Various aspects of the present invention relate generally to cascading style sheets, and in particular, to cascading style sheet isolation and coexistence such that separate content on a markup page can use different cascading style sheet rules.

Cascading Style Sheets (CSS) is a popular "style sheet" language that is used to "stylize" pages written in a markup language, e.g., hypertext markup language (HTML). In general, CSS can be used to separate out the presentation semantics, i.e., style, such as the look and formatting of a markup page, from the content of the markup page. By separating the presentation semantics from the content, the style, such as the layout, color, font, etc., of the markup page can be rapidly and easily changed without modifying the underlying content simply by replacing or modifying the CSS associated with the underlying content. Moreover, CSS can be used to present the same markup page content in different styles, e.g., to accommodate different types of output device, different display resolutions, etc. Still further, because CSS can be used to define how HTML elements look, multiple pages can be given a uniform style using the same CSS theme.

BRIEF SUMMARY

According to aspects of the present invention, cascading style sheet rules are managed by identifying a markup page of content items, and by designating a plurality of super-themes. Super-themes are designated by defining a first markup element that associates at least one content item of the markup page with a first cascading style sheet class and by designating the first markup element by a first super-theme. Super-themes are further designated by defining a second markup element that associates at least one content item of the markup page with a second cascading style sheet class different from the first cascading style sheet class and by designating the second markup element by a second super-theme. Cascading style sheet rules are further managed by loading a common cascading style sheet for the markup page, by automatically modifying the common cascading style sheet to use the first super-theme as a parent selector for at least one cascading style sheet rule applied to a content item within the first super-theme designated markup element and by automatically modifying the common cascading style sheet to use the second super-theme as a parent selector for at least one cascading style sheet rule applied to a content item within the second super-theme designated markup element.

BRIEF DESCRIPTION OF THE SEVERAL VIEWS OF THE DRAWINGS

One or more exemplary aspects of the present invention are set forth with reference to the following detailed description and drawings, where like reference numerals are used to refer to like elements throughout, in which.

In the following detailed description, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of the present invention.

DETAILED DESCRIPTION

Aspects of the present invention provide for the management of cascaded style sheet rules in a manner that facilitates cascading style sheet isolation and coexistence within a markup page. As such, separate content on the markup page can use different cascading style sheet rules, even if those cascading style sheet rules are otherwise incompatible. Moreover, the management of cascaded style sheet rules described more fully herein provides an automated process for modifying the cascading style sheet to prevent interference in the visual and/or functional output of different content on the markup page. Thus, markup pages, including aggregated markup pages, are displayed in such a way that visual and functional anomalies are avoided, despite cascading style sheet rules that would otherwise conflict between the aggregated page content.

Figure 1:
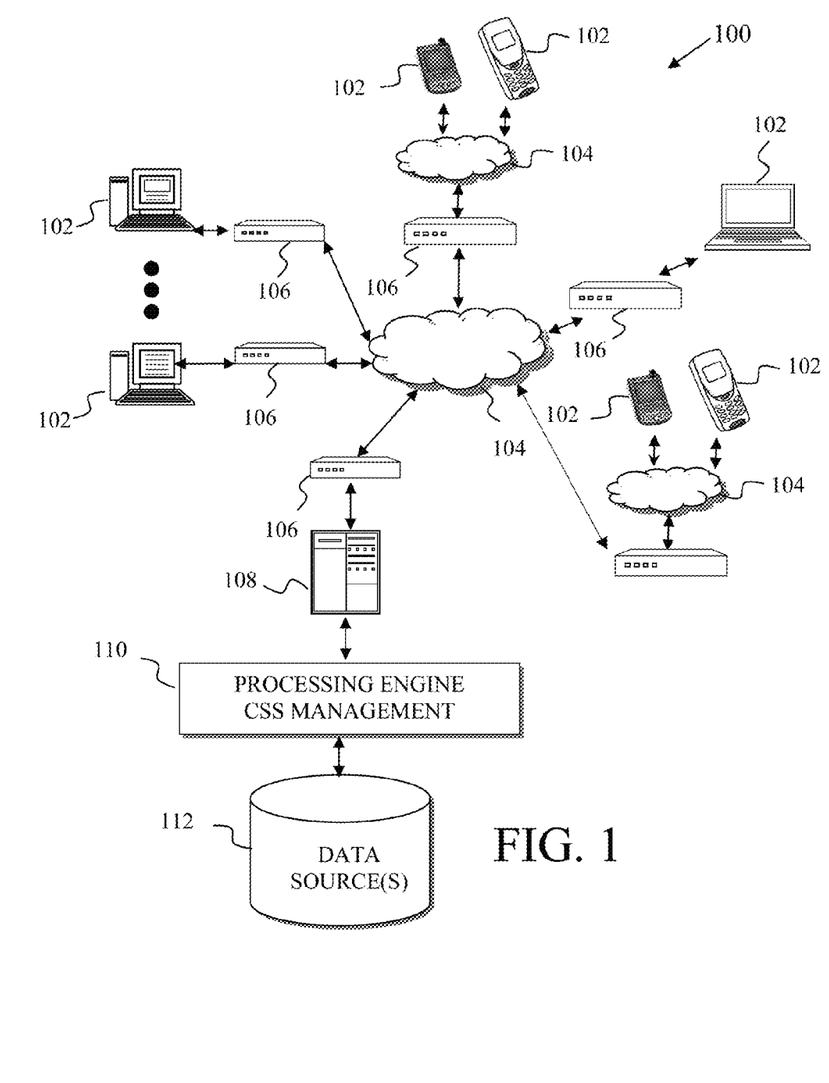
FIG. 1 is a schematic diagram illustrating exemplary devices that can execute applications for managing cascading style sheets according to aspects of the present invention.

Referring now to the drawings and particularly to FIG. 1, a general diagram of a computer system 100 is illustrated according to various aspects of the present invention. The computer system 100 comprises a plurality of hardware and/or software processing devices, designated generally by the reference 102 that are linked together by a network 104. Typical processing devices 102 include for example, personal computers, netbook computers, notebook computers, tablet computers and servers. Further examples of processing devices 102 include personal data assistant (PDA) processors, palm computers, cellular devices including cellular mobile telephones, and smart telephones, transactional systems, purpose-driven appliances, special purpose computing devices and/or other devices capable of communicating over the network 104.

The network 104 provides communications links between the various processing devices 102, and may be supported by networking components 106 that interconnect the processing devices 102, including for example, routers, hubs, firewalls, network interfaces, wired or wireless communications links and corresponding interconnections, cellular stations and corresponding cellular conversion technologies, e.g., to convert between cellular and tcp/ip, etc. Moreover, the network 104 may comprise connections using one or more intranets, extranets, local area networks (LAN), wide area networks (WAN), wireless networks (WIFI), the Internet, including the world wide web, and/or other arrangements for enabling communication between the processing devices 102, in either real time or otherwise, e.g., via time shifting, batch processing, etc.

The illustrative system 100 also includes a server 108, e.g., a web server, file server, and/or other processing device that supports a processing engine 110 and a corresponding data source 112. In an exemplary implementation, the server 108 is a web server that stores or otherwise manages information such as network-retrievable web pages in the data source 112. In this manner, conventional web browsers may be executed on the various processing devices 102 to retrieve desired content from the network 104, such as by identifying to the corresponding server 108, a unique uniform resource locator (URL) for the associated content stored in the data source(s) 112.

Although illustrated with one server 108 for purposes of clarity of discussion herein, any number of different servers 108 may be deployed across the network. Thus, the server 108 may also schematically represent one or more servers, each server performing a different function, e.g., web server, file server, back-end processing server, etc., as is necessary to support the functionality provided by the network 104, such as the Internet. The system 100 is shown by way of illustration, and not by way of limitation, as a computing environment in which various aspects of the present invention may be practiced.

According to various aspects of the present invention, one or more of the processing devices 102 or server 108 are configured for processing, manipulating or otherwise displaying web pages. In this regard, the processing engine 110 of the sever 108 is configured specifically for the management of cascading style sheets as will be described in greater detail herein.

Incompatibility of cascading style sheets presents considerable difficulty to content providers, including those content providers that must update their content frequently and in synchronization with any new version of the web application that might include updated cascading style sheets. Under this scenario, the content provider cannot remain at the previous version of the cascading style sheet or move ahead to newer versions of the cascading style sheet without causing display, formatting and other outputting issues.

For instance, web pages can be composed of content from more than one source. This is relevant, by way of example, in a web application that aggregates separate content into a web page or pages, often termed a web portal. In an illustrative application of a web portal, the server 108 provides access control and procedures that consolidate multiple applications and databases, e.g., stored in the data source 112, where the applications and data can be originate from different entities altogether. In the web portal application, the separate pieces of content that are aggregated together often will use cascading style sheet rules that, due to the nature of cascading style sheets, affect content anywhere on the page rather than just the associated/localized content section or content component of a web page. This global approach to page handling of cascading style sheets can create visual and functional anomalies in the aggregated content.

However, according to aspects of the present invention, the processing engine 110 automatically modifies cascading style sheet rules to allow them to be isolated to a subsection of a markup page, even if that page is an aggregated page comprised of sections from multiple sources. The modification performed by the process engine 110 (or other processor of the system 100) could be done at content creation time, content deployment time, content aggregation time, etc. Moreover, the management of cascading style sheets as set out herein requires little to no impact to the content creator.

Figure 2:
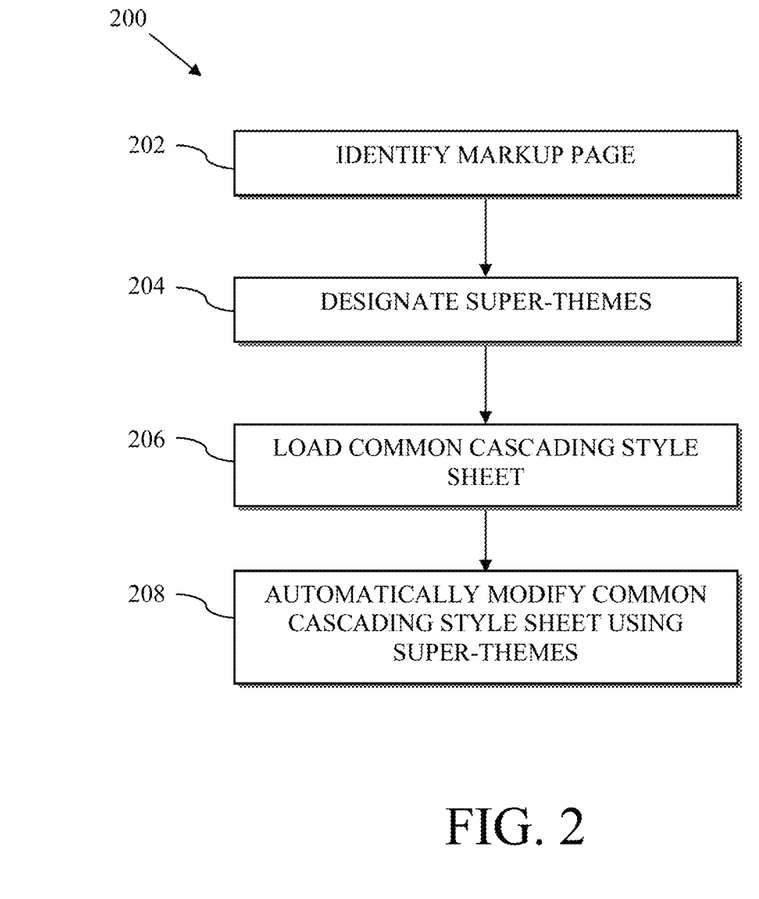
FIG. 2 is a flow chart illustrating a method of managing cascaded style sheet rules according to various aspects of the present invention.

Referring to FIG. 2, an exemplary method 200 is illustrated for managing cascading style sheets according to various aspects of the present invention. The method 200 may be implemented, for instance, as computer code stored on a tangible, non-transitory computer-readable storage medium such that when the code is read out and executed by a processor, the electronic device implements the method 200. In this regard, the processing engine 110 of server 108 (FIG. 1), a processing device 102 (FIG. 1) or other device capable of executing software instructions, can be used to implement the method 200.

In the method 200, a markup page of content items is identified at 202. The markup page may comprise for instance, an HTML page, an aggregated page from multiple sources, etc. A plurality of "super-themes" is designated at 204. As will be described more fully herein, super-themes allow for cascading style sheet rules to be locally applied to specific subsections of a markup page.

A common cascading style sheet for the markup page is loaded at 206. The common cascading style sheet is automatically modified at 208 to use the super-themes designated at 204 as will be described in greater detail herein.

Figure 3:
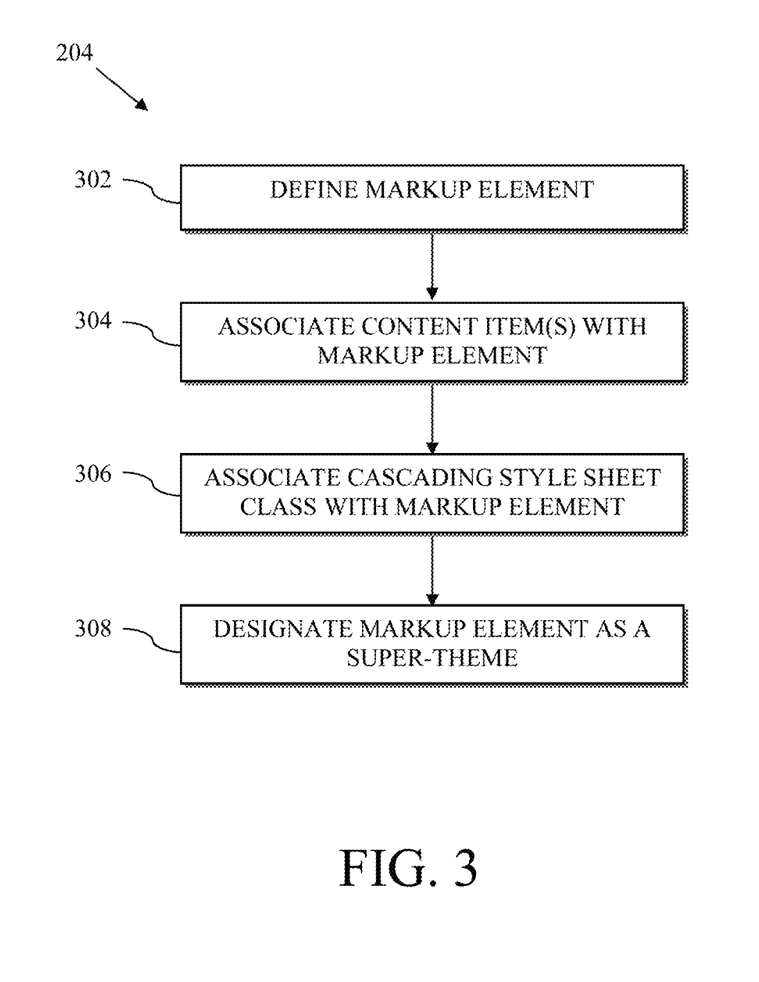
FIG. 3 is a flow chart illustrating a method of designating super-themes for managing cascaded style sheets according to various aspects of the present invention.

Referring to FIG. 3, an exemplary method 300 is illustrated for designating super-themes at 204 (FIG. 2) according to various aspects of the present invention. A markup element is defined at 302. At least one content item is associated with the defined markup element at 304. A cascading style sheet class is associated with the markup element at 306. The markup element is designated as a super-theme at 308.

By way of illustration and not by way of limitation, a plurality of super-themes can be designated in a markup page by defining a first markup element that associates at least one content item of the markup page with a first cascading style sheet class, and by designating the first markup element a first super-theme. In an illustrative implementation, a first markup element is defined by rendering inline, a first content item of the markup page by enclosing the first content item in the first markup element, and by giving the first markup element a cascading style sheet class specific to the enclosed content item, thus designating the first super-theme.

The plurality of super-themes can be further designated in a markup page by defining a second markup element that associates at least one content item of the markup page with a second cascading style sheet class different from the first cascading style sheet class, and by designating the second markup element a second super-theme. In an illustrative implementation, the second markup element is defined by rendering inline, a second content item of the markup page by enclosing the second content item in the second markup element, and by giving the second markup element a cascading style sheet class specific to the enclosed second content item, thus designating the second super-theme.

The above process of defining a super-theme is repeated as many times as necessary. When the process is complete, a super-theme may have been created for each content item of a markup page. For instance, designating a plurality of super-themes can optionally be carried out by designating each content item of the markup page with a corresponding unique markup element that is associated with a corresponding cascaded style sheet class so as to super-theme each content item of the markup page individually.

Alternatively, content items can be grouped, e.g., by component, such as in the case of aggregated markup pages, or by groups of related style within a markup page. In this manner, the management of cascading style sheets can be carried out by automatically modifying the common cascading style sheet to use the first super-theme as a parent selector for at least one cascading style sheet rule applied to at least one content item within the first super-theme designated markup element. Further, the management of cascading style sheets can be carried out by automatically modifying the common cascading style sheet to use the second super-theme as a parent selector for at least one cascading style sheet rule applied to at least one content item within the second super-theme designated markup element. Again, this process can continue for each designated super-theme.

As an example:
Before Super-Theming
HTML Component A
   Cascading Style Sheet Rule 1
   Content A
HTML Component B
   Cascading Style Sheet Rule 2
   Content B
After Super-Theming
HTML Component A, Container A, Cascading Style Sheet Class 1 Container A(Content A, Updated Cascading Style Sheet Rule(s))
HTML Component B, Container B, Cascading Style Sheet Class 2
   Container B(Content B, Updated Cascading Style Sheet Rule(s))

As will be described in greater detail herein, automatic modification of the cascading style sheet can be performed at the time of content creation, at the time of content deployment, at the time of content aggregation and rendering, etc.

Aggregation of Markup

A page of content items can be constructed as an aggregated markup page by aggregating at least a first subsection of content items and a second subsection of content items, where the first and second subsections can be obtained from the same, or different sources.

In a first exemplary implementation, each content item of the first subsection shares at least one super-theme and a first common theme, and each content item of the second subsection shares at least one super-theme and a second common theme, such that each super-theme of the first subsection is different from each super-theme of the second subsection. In this regard, the first subsection and the second subsection share a single common cascading style sheet when aggregated.

Figure 4:
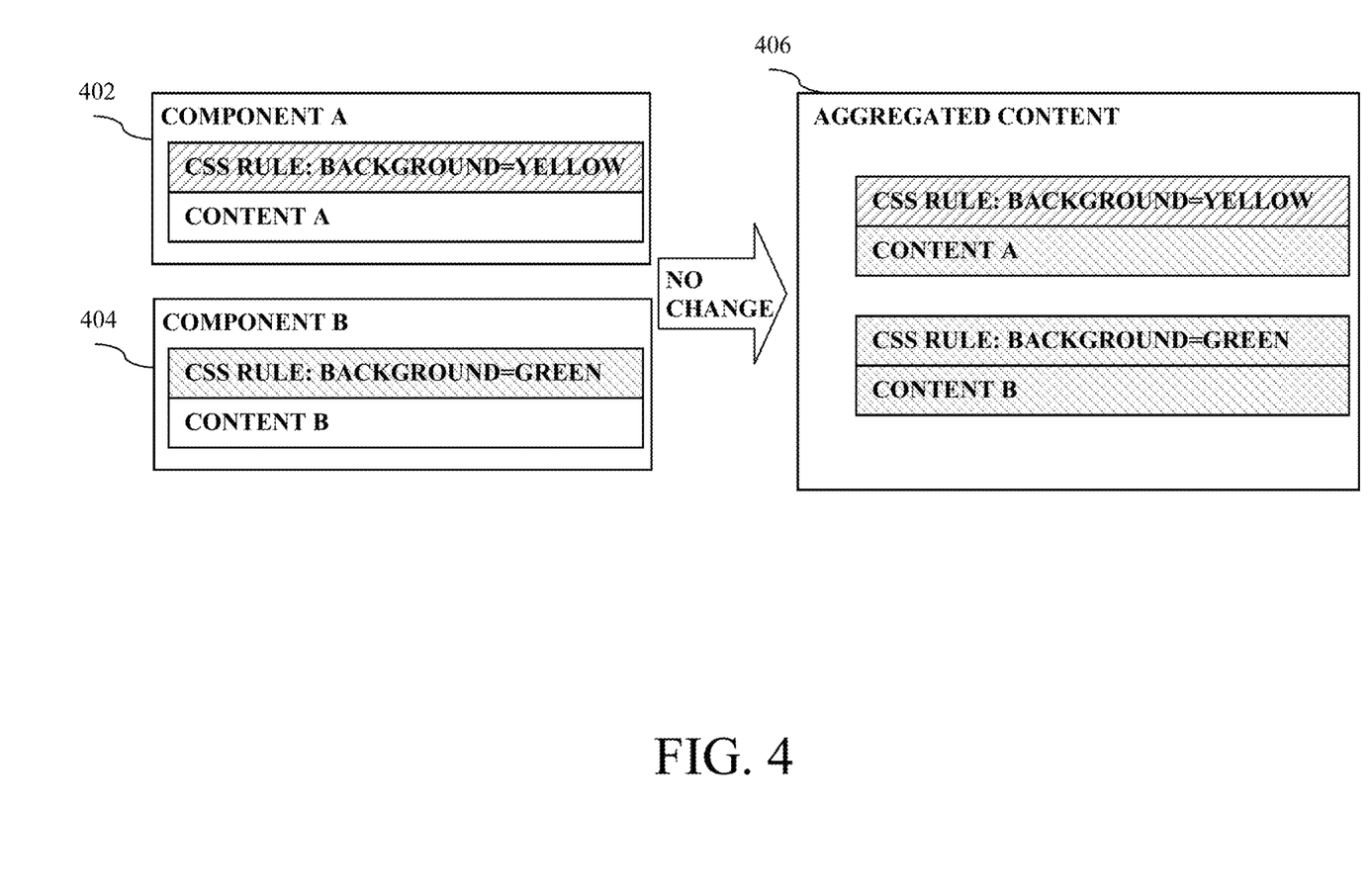
FIG. 4 is a block diagram illustrating how lack of management of cascaded style sheet rules in an aggregated content page can result in improper formatting.
Figure 5:
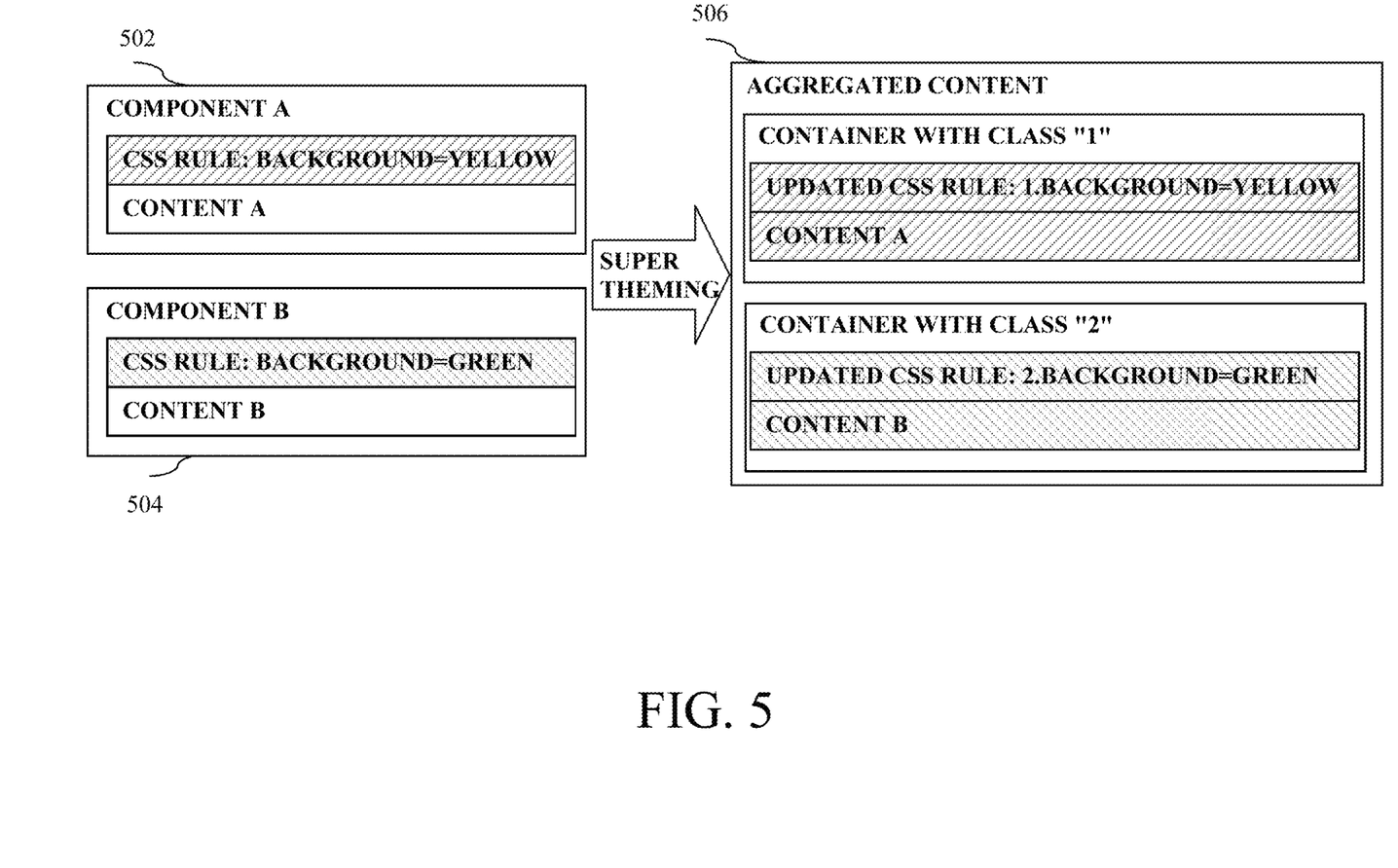
FIG. 5 is a block diagram illustrating the management of cascaded style sheet rules in an aggregated content page according to various aspects of the present invention.

An illustrative example of super-theming is illustrated in FIGS. 4 and 5 for an application that comprises aggregating markup components into an aggregated page. Referring to FIG. 4, without super-theming, a first component 402, designated COMPONENT A includes a cascading style sheet rule of background=Yellow. COMPONENT A also includes CONTENT A. A second component 404, designated COMPONENT B includes a cascading style sheet rule of background=Green. COMPONENT B also includes CONTENT B. When a markup page 406 is created by aggregating COMPONENT A and COMPONENT B into an aggregated markup, the cascading style sheet rule background=Yellow is lower in priority than cascading style sheet rule Background=Green. As such, both CONTENT A and CONTENT B are rendered with a background color set to Green. Here, the last defined cascading style sheet rule overrides other rules, resulting in styles inappropriately applied to other content. Thus, the wrong style is applied to CONTENT A.

Referring to FIG. 5, the process starts initially with an analogous markup as set out in the example of FIG. 4. That is, a first component 502, designated Component A includes a cascading style sheet rule of background=Yellow. Component A also includes CONTENT A. A second component 504, designated COMPONENT B, includes a cascading style sheet rule of background=Green. Component B also includes CONTENT B. However, super-theming is applied as set out with regard to FIGS. 2-3. As such, when a markup page 506 is created by aggregating COMPONENT A and COMPONENT B into an aggregated markup, the cascading style sheet rule background=Yellow is isolated and independent from cascading style sheet rule Background=Green. This is accomplished because each content item on the aggregated markup page is rendered inline, and is enclosed in an HTML element that is given a cascading style sheet class specific to that content item, referred to herein as a super-theme. Thus, within the aggregated markup page, a first markup element (CONTAINER WITH CLASS 1) contains a content item (CONTENT A) along with the updated cascading style sheet rule Background=Yellow which was automatically updated from a common cascading style sheet. A second markup element (CONTAINER WITH CLASS 2) contains a content item (CONTENT B) along with the updated cascading style sheet rule Background=Green, which was automatically updated from the common cascading style sheet. As such, CONTENT A is rendered with a background of Yellow, and CONTENT B is rendered with a background of Green.

In the above-examples, the cascading style is automatically modified to use the super-theme associated with a corresponding content item as a parent selector for each rule, so that the content's cascading style sheet will apply only to the content within the super-theme bearing HTML element. Thus, with super-theming, the last defined cascading style sheet rule does not necessarily override other super-themed rules, resulting in styles appropriately applied to other content.

Examples of Alternative Implementations:

In a first exemplary alternate implementation, the cascading style sheet modification is automatically carried out when the author creates content. For instance, the content author can specify the super-theme, allowing content from multiple sources to share a cascading style sheet and improve performance. Authors that collaborate, even from separate products and teams, can share a super-theme and share common cascading style sheet. However, the framework must rely on the content authors to ensure super-theming is complete.

In another alternative implementation, the cascading style sheet modification is carried out when deployed into the aggregating web application. For instance, the web application can ensure isolation, while allowing content deployed in the same package to share cascading style sheet and improve performance. Each content piece from the same package can share a super-theme and share common cascading style sheet.

As yet another illustrative example, the cascading style sheet modification is carried out when the aggregating web application renders each page. Under this configuration, the web application framework can completely isolate content, even if multiple instances of the content are rendered on the same page. Each content piece will be uniquely super-themed.

Additional alternative implementations include allowing the installer to specify the super-theme to use with each package or allowing an end user to control super-theming as preferences of each content element.

By managing the scope of cascading style sheet rules through automatic super-theming, even pages constructed from aggregating content from multiple sources can allow flexible cascading style sheet theming, thus eliminating the need for all content to be developed in lock-step to use the same libraries and associated cascading style sheet rules.

Accordingly, aspects of the present invention allow separate content on a page to use incompatible cascading style sheet rules without interference. Notably, aspects described in greater detail herein do not require that all content of a page use the same cascading style sheet. Moreover, cascading style sheet rules are managed in such a way that there is no need to isolate content, e.g., using i-frames of other similar encapsulation techniques that create performance impacts and costs. For instance, when using i-frames, only after the initial page is loaded can the i-frames begin to load, requiring additional network traffic and separate loading of cascading style sheet and JavaScript® (JavaScript is a registered trademark of Oracle and/or its affiliates) in each i-frame. To the contrary, by aggregating the content inline, cascading style sheet conflicts, as well as JavaScript and naming conflicts, are avoided.

Still further, various aspects of the present invention facilitate communication between content pieces, which is otherwise limited using conventional approaches.

Dojo:

According to further aspects of the present invention, an aggregated markup page is constructed that provides for the co-existence of multiple instances of an associated collection of JavaScript utilities on a single aggregated markup page where each collection of JavaScript utilities provides its own collection of cascading style sheet rules.

This aspect of the present invention is suitable for integration with the Dojo toolkit. Dojo is a collection of JavaScript utilities and widget libraries commonly used to build complex interfaces. Dojo provides the ability to namespace the JavaScript code to prevent conflicts between multiple versions of Dojo on the same page. Here, aspects of the present invention allow the cascading style sheet rules used by Dojo or other content to avoid conflict, even on aggregated markup pages.

As such, aspects of the invention herein are useful, for example, to serve as a feature of the Tivoli Integrated Portal (TIP) to allow coexistence of multiple versions of Dojo on a single page. In such an environment, a TIP 'page' is constructed from a collection of portlets from any number of separate modules to allow an integrated experience. Each portlet can use its own instance of a widget library such as Dojo, which may include both JavaScript and cascading style sheet rules. By using aspects set out herein, the cascading style sheet rules are maintained in isolation to enable coexistence of style sheets, even in the same aggregated markup page, in such a way that the content items are properly rendered.

Moreover, aspects of the present invention do not rely on analysis and identification of document object model elements in order to modify styles. Also, aspects of the present invention are not limited to dealing with only named styles that can be found in the document object model. Rather, aspects of the present invention can deal with generic style definitions such as a style rule on just "div". Moreover, as noted in greater detail herein, cascading style sheet management can be performed at development time, install time, runtime, or any point in between and need only be performed once for a specific piece of content.

Aspects of the present invention avoid process-intensive processing of every element in content to be added. To the contrary, aspects of the present invention can be performed as a single modification of the cascading style sheet involved and a minor change to the content aggregation. There is no need to parse the document object model content at all for 'detection'. Further, a determination of element origin or cascading style sheet origin and modification of content is completely avoided. Thus, pre-processing of new content is not required.

Aspects of the present invention require no modification of the content itself, only of the cascading style sheet rules and parts of the page controlled by the aggregation engine. Additional content added dynamically or modified is therefore fully and automatically handled. As such, content dynamically added to or modified in the page by scripts from the content itself can be handled. Additional content added dynamically or modified is therefore fully and automatically handled by the proposed invention.

Figure 6:
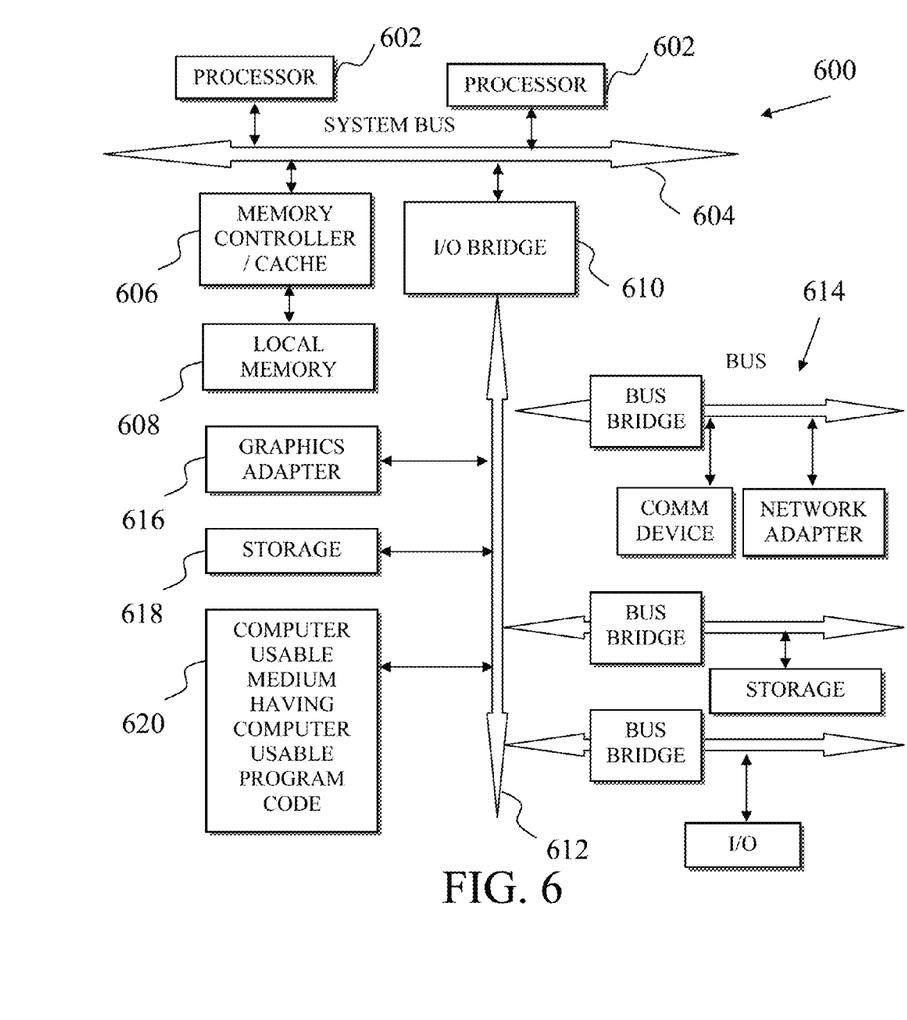
FIG. 6 is a block diagram of a computer system having a computer readable storage medium such as a computer readable storage device for implementing functions including the management of cascaded style sheet rules according to various aspects of the present invention as described in greater detail herein.

Exemplary Computer System:

Referring to FIG. 6, a block diagram of a data processing system is depicted in accordance with the present invention. Data processing system 600 may comprise a symmetric multiprocessor (SMP) system or other configuration including a plurality of processors 610 connected to system bus 620. Alternatively, a single processor 610 may be employed. Also connected to system bus 620 is memory controller/cache 630, which provides an interface to local memory 640. An I/O bus bridge 650 is connected to the system bus 620 and provides an interface to an I/O bus 660. The I/O bus may be utilized to support one or more buses and corresponding devices 670, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 680, storage 690 and a computer usable storage medium 695 having computer usable program code embodied thereon. The computer usable program code may be executed to implement any aspect of the present invention, for example, to implement any aspect of any of the methods and/or system components illustrated in FIGS. 1-5. Moreover, the computer usable program code may be utilized to implement any other processes that are associated with the automatic modification of cascading style sheets for isolation and co-existence, or other aspects as set out further herein.

The data processing system depicted in FIG. 6 may comprise, for example, an IBM RS/6000 system, a product of International Business Machines Corporation in Armonk, N.Y., running the Advanced Interactive Executive (AIX) operating system. An object oriented programming system such as Java® (Java is a registered trademark of Oracle and/or its affiliates) may run in conjunction with the operating system and provides calls to the operating system from Java programs or applications executing on data processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A method of managing cascading style sheet rules, comprising:
    identifying, by a web application on a server, a markup page of content items;
    designating, by the web application, a plurality of super-themes by:

defining a first markup element that associates a first container that contains a first content item of the markup page and a first cascading style sheet rule, with a first cascading style sheet class;
designating the first markup element by a first super-theme;
defining a second markup element that associates a second container that contains a second content item of the markup page and a second cascading style sheet rule, with a second cascading style sheet class different from the first cascading style sheet class; and
designating the second markup element by a second super-theme;
loading a common cascading style sheet for the markup page;
automatically modifying, by a processor, the common cascading style sheet to use the first super-theme as a parent selector for selecting the first cascading style sheet rule from the first container, which is applied to the first content item, wherein:
the first super-theme causes the first cascading style sheet rule to apply only to the first content item, such that the first cascading style sheet rule does not override other cascading style sheet rules; and
automatically modifying, by the processor, the common cascading style sheet to use the second super-theme as a parent selector for selecting the second cascading style sheet rule from the second set of cascading style sheet rules, which is applied to the second content item, wherein:
the second super-theme causes the second cascading style sheet rule to apply only to the second content item, such that the second cascading style sheet rule does not override other cascading style sheet rules.

2. The method of claim 1, wherein:
defining a first markup, comprises:
rendering inline, a content item by enclosing the content item in the first markup element that is given a cascading style sheet class specific to the content item, designating the first super theme.

3. The method of claim 1, wherein:
designating a plurality of super-themes, further comprises:
designating each content item of the markup page with a corresponding unique markup element that is associated with a corresponding cascaded style sheet class so as to super-theme each content item.

4. The method of claim 1, wherein:
identifying a markup page of content items comprises:
constructing a web portal as an aggregated markup page by aggregating at least a first subsection of content items and a second subsection of content items, where the first and second subsections are obtained from different sources so as to consolidate multiple applications and databases.

5. The method of claim 4, wherein:
each content item of the first subsection shares at least one super-theme and a first common theme, and each content item of the second subsection shares at least one super-theme and a second common theme, such that each super-theme of the first subsection is different than each super-theme of the second subsection.

6. The method of claim 5, wherein:
the first subsection and the second subsection share a single common cascading style sheet.

7. The method of claim 4, wherein:
constructing the web portal further comprises:
constructing an aggregated markup page that provides for the co-existence of multiple instances of an associated collection of JavaScript utilities on a single aggregated markup page where each collection of JavaScript utilities provides its own collection of cascading style sheet rules.

8. The method of claim 1, wherein:
automatically modifying the cascading style sheet is performed at the time of content rendering.

9. The method of claim 1, wherein:
automatically modifying the cascading style sheet is performed at the time of content deployment.

10. A system for managing cascading style sheet rules, comprising:
a server having a microprocessor coupled to a memory, wherein the microprocessor is programmed to manage cascading style sheet rules by:
identifying, by a web application on the server, a markup page of content items;
designating, by the web application a plurality of super-themes by:
defining a first markup element that associates a first container that contains a first content item of the markup page and a first cascading style sheet rule, with a first cascading style sheet class;
designating the first markup element by a first super-theme;
defining a second markup element that associates a second container that contains a second content item of the markup page and a second cascading style sheet rule, with a second cascading style sheet class different from the first cascading style sheet class; and
designating the second markup element by a second super-theme;
loading a common cascading style sheet for the markup page;
automatically modifying, by a processor, the common cascading style sheet to use the first super-theme as a parent selector for selecting the first cascading style sheet rule from the first container, which is applied to the first content item, wherein:
the first super-theme causes the first cascading style sheet rule to apply only to the first content item, such that the first cascading style sheet rule does not override other cascading style sheet rules; and
automatically modifying, by the processor, the common cascading style sheet to use the second super-theme as a parent selector for selecting the second cascading style sheet rule from the second set of cascading style sheet rules, which is applied to the second content item, wherein:
the second super-theme causes the second cascading style sheet rule to apply only to the second content item, such that the second cascading style sheet rule does not override other cascading style sheet rules.

11. Computer readable hardware with an executable program stored thereon, wherein the program instructs a microprocessor of a server to manage cascading style sheet rules, comprising:
identifying, by a web application on the server, a markup page of content items;
designating, by the web application, a plurality of super-themes by:
defining a first markup element that associates a first container that contains a first content item of the markup page and a first cascading style sheet rule, with a first cascading style sheet class;

designating the first markup element by a first super-theme;

defining a second markup element that associates a second container that contains a second content item of the markup page and a second cascading style sheet rule, with a second cascading style sheet class different from the first cascading style sheet class; and designating the second markup element by a second super-theme;

loading a common cascading style sheet for the markup page;

automatically modifying, by a processor, the common cascading style sheet to use the first super-theme as a parent selector for selecting the first cascading style sheet rule from the first container, which is applied to the first content item, wherein:

the first super-theme causes the first cascading style sheet rule to apply only to the first content item, such that the first cascading style sheet rule does not override other cascading style sheet rules; and automatically modifying, by the processor, the common cascading style sheet to use the second super-theme as a parent selector for selecting the second cascading style sheet rule from the second set of cascading style sheet rules, which is applied to the second content item, wherein:

the second super-theme causes the second cascading style sheet rule to apply only to the second content item, such that the second cascading style sheet rule does not override other cascading style sheet rules.

12. The computer readable hardware of claim 11, wherein:
the program instructions defining a first markup, comprises program instructions for:
rendering inline, a content item by enclosing the content item in the first markup element that is given a cascading style sheet class specific to the content item, designating the first super theme.

13. The computer readable hardware of claim 11, wherein:
the program instructions for designating a plurality of super-themes, further comprises program instructions for:
designating each content item of the markup page with a corresponding unique markup element that is associated with a corresponding cascaded style sheet class so as to super-theme each content item.

14. The computer readable hardware of claim 11, wherein:
the program instructions for identifying a markup page of content items comprises program instructions for:
constructing a web portal as an aggregated markup page by aggregating at least a first subsection of content items and a second subsection of content items, where the first and second subsections are obtained from different sources so as to consolidate multiple applications and databases.

15. The computer readable hardware of claim 14, wherein:
each content item of the first subsection shares at least one super-theme and a first common theme, and each content item of the second subsection shares at least one super-theme and a second common theme, such that each super-theme of the first subsection is different than each super-theme of the second subsection.

16. The computer readable hardware of claim 15, wherein:
the first subsection and the second subsection share a single common cascading style sheet.

17. The computer readable hardware claim 14, wherein:
the program instructions for constructing the web portal further comprises program instructions for:
constructing an aggregated markup page that provides for the co-existence of multiple instances of an associated collection of JavaScript utilities on a single aggregated markup page where each collection of JavaScript utilities provides its own collection of cascading style sheet rules.

18. The computer readable hardware of claim 11, wherein:
the program instructions for automatically modifying the cascading style sheet is performed at the time of content rendering.

19. The computer readable hardware claim 11, wherein:
the program instructions for automatically modifying the cascading style sheet is performed at the time of content deployment.

20. The computer readable hardware of claim 11, wherein:
the program instructions for automatically modifying the cascading style sheet is performed at the time of content aggregation.

* * * * *